United States Patent

Miyabayashi et al.

Patent Number: 5,851,694
Date of Patent: Dec. 22, 1998

[54] REDOX FLOW TYPE BATTERY

[75] Inventors: Mitsutaka Miyabayashi; Kanji Sato; Toshiyuki Tayama; Yoshiteru Kageyama; Haruo Oyama, all of Ibaraki-ken, Japan

[73] Assignee: Kashima-Kita Electric Power Corporation, Ibaraki-ken, Japan

[21] Appl. No.: 873,453

[22] Filed: Jun. 12, 1997

[30] Foreign Application Priority Data

Jun. 19, 1996 [JP] Japan .................................. 8-158477

[51] Int. Cl.$^6$ .................................................. H01M 8/20
[52] U.S. Cl. ............................................ 429/105; 429/15
[58] Field of Search ..................................... 429/105, 101, 429/72, 15, 17, 19

[56] References Cited

U.S. PATENT DOCUMENTS

| 4,485,154 | 11/1984 | Remick et al. | 429/14 |
| 4,784,924 | 11/1988 | Savinell et al. | 429/15 |
| 4,786,567 | 11/1988 | Skyllas-Kazacos et al. | 429/19 |

*Primary Examiner*—Anthony Skapars
*Attorney, Agent, or Firm*—Oblon, Spivak, McClelland, Maier & Neustadt, P.C.

[57] ABSTRACT

The present invention relates to a liquid-circulating type redox flow battery which comprises (a) said battery being defined by a ratio (H/L) where (H) is the average height of each of said porous electrodes in a flow direction of each of said electrolytic solutions, and (L) is the length of each of said porous electrodes in a direction perpendicular to the flow direction of each of said electrolytic solutions, the ratio (H/L) being in the range of 0.18 to 1.95; and (b) said battery being defined by ratios $(\Sigma s_{ai}/S_a)$ and $(\Sigma s_{ci}/S_c)$ where $(\Sigma s_{ai})$ is the sum of the cross-sectional area of an inlet for introducing said positive electrolytic solution into said positive cell, $(\Sigma s_{ci})$ is the sum of the cross-sectional area of an inlet for introducing said negative electrolytic solution into said negative cell, $(S_a)$ is the average of the cross-sectional area of said porous electrode in a direction perpendicular to the flow direction of said positive electrolytic solution, and $(S_c)$ is the average of the cross-sectional area of said porous electrode in a direction perpendicular to the flow direction of said negative electrolytic solution, each of the ratios $(\Sigma s_{ai}/S_a)$ and $(\Sigma s_{ci}/S_c)$ being in the range of 0.001 to 0.04, and said battery being further defined by ratios $(\Sigma s_{ao}/S_a)$ and $(\Sigma s_{co}/S_c)$ where $(\Sigma s_{ao})$ is the sum of the cross-sectional area of an outlet for discharging said positive electrolytic solution out of said positive cell, $(\Sigma s_{co})$ is the sum of the cross-sectional area of an outlet for discharging said negative electrolytic solution out of said negative cell, and $(S_a)$ and $(S_c)$ are as denoted above, each of the ratios $(\Sigma s_{ao}/S_a)$ and $(\Sigma s_{co}/S_c)$ being in the range of 0.001 to 0.04.

10 Claims, 2 Drawing Sheets

ENLARGED VIEW OF PORTION A

REDOX FLOW TYPE BATTERY

BACKGROUND OF THE INVENTION

1. Field of the Invention

This invention relates to the art of batteries and has particular reference to a secondary battery of a redox flow type.

2. Description of the Related Art

Nowadays, global warming has become a serious social problem which arises primarily from consumption of fossil fuels in large amounts with consequential increase in concentration of atmospheric carbon dioxide. This problem has given great impetus to the development of solar type batteries as sources of clean energy. However, since such solar batteries are not useful for power generation at night and during rainfall, some type of secondary battery is strongly needed which has excellent performance and is suitable for cooperative use with the solar batteries.

On the other hand, conventional power plants are required to provide power generation capacities that can cover the daytime peak demands for electric power. The reason lies in the marked difference in power demand between day and night. However, invites decreased load efficiency of the equipment for electric power generation. In order to eliminate this problem, it is necessary to store electric power at night in large-sized storage batteries to be supplied for daytime consumption such that daily operating load can be averaged out with increased operating efficiency of the equipment. Thus, there is a growing demand for developing a large capacity battery for power storage.

In addition, development of a secondary battery which has output density great enough to be suitable as a movable source of electric energy for electric vehicles and so on.

Redox batteries are a bright prospect, as a new type of secondary battery, for application in the aforementioned fields. Such batteries are advantageous in that they may be charged matching with the output voltage of a solar battery by means of a tap changer. They also have a simple structure and hence are easy to scale up.

A secondary redox flow type battery is taken to denote a battery in which charge and discharge are carried out by taking advantage of an oxidation-reduction or redox reaction and by permeating active materials of a liquid type through positive and negative electrodes, thus allowing such active materials to circulate in liquid-pervious electrolytic cells. The redox flow type secondary batteries have the following advantages over conventional secondary batteries.

(1) The storage capacity can be made large simply by increasing the volume of the storage container and the amount of active materials. The electrolytic cell itself may be left as it is so long as the output does not need to be increased;

(2) The positive and negative materials can be stored in a completely separated condition in the container. Hence, self-discharge is less likely to occur than in the case of a battery in which two such active materials are placed normally in contact with their corresponding electrodes;

(3) In a porous carbon electrode of a liquid-pervious type used in redox flow type secondary batteries, ions of the active materials enable charge and discharge reactions (electrode reactions) merely by electron exchange on the electrode surfaces, thus resulting in simplified electrode reaction. In such instances, no adverse ion deposits take place on the electrodes unlike a zinc-bromine battery that tends to cause zinc ions to deposit on the electrodes.

Among redox flow-type secondary batteries which have been developed to date, iron-chromium batteries are known which, however, have not been made practical because such batteries have the defects of low energy density and objectionable intermixing of iron and chromium through the ion exchange membrane.

Alternatively, an all-vanadium redox flow type battery has been proposed as disclosed in "J. Electrochem. Soc.", 133, 1057 (1986) and Japanese Patent Publication No. 62-186473. Such prior art battery is advantageous, as compared to the iron-chromium battery, in that it has great electromotive force and large in battery capacity. Also advantageously, even where positive and negative electrolytic solutions intermix with each other through the permeable membrane, they can be easily separated or regenerated upon charging and can be completely closed with no decline in battery capacity. This is due to the fact that the all-vanadium battery is composed literally of a single element.

However even in the case of use of the redox flow-type all-vanadium batteries, sufficient scaling up must be effected by enlarging the area of each of the associated electrodes, uniform distribution must be established to flow electrolytic solutions in the electrodes in order to diminish cell resistance, great power efficiency has to be maintained even at a relatively high current density, and minimum pumping power must be attained to have the electrolytic solutions permeate through the electrodes so as to increase energy efficiency. Such known redox flow-type all-vanadium batteries has been found insufficient to meet those requirements.

In particular, increased heights of positive and negative electrolytic cells that result from enlarging electrode area would lead to a rise in pumping power needed to permeate the positive and negative electrolytic solutions through the electrodes, eventually resulting in a decline in energy efficiency. Conversely, if the heights of the positive and negative cells are decreased to obtain lowered pumping power to permeate of those solutions through the electrodes, or also if the widths of such cells are increased to obtain increased electrode area, then the positive and negative solutions would invite an irregularly distributed flow in the electrodes, . Moreover, forcible application of a relatively high current density would involve large cell resistance and hence low power efficiency.

For those reasons, a continuing need exists for the development of a redox flow type battery which has a large capacity with increased area of each of the associated electrodes and which exhibits uniform flow distributions of positive and negative electrolytic solutions in the electrodes, small cell resistance even at relatively high current densities to thereby maintain great power efficiency, and which only requires low pumping power to permeate the electrolytic solutions through the electrodes so as to attain high energy efficiency.

SUMMARY OF THE INVENTION

Accordingly, a principal object of the present invention lies in the provision of a redox flow type battery which is of a large capacity with increased area of each of the associated electrodes and which is capable of affording uniform flow distribution of positive and negative electrolytic solutions in the electrodes, small cell resistance even at a relatively high current density to thereby maintain great power efficiency, and low pumping power requirement for permeating the electrolytic solutions through the electrodes so as to attain high energy efficiency.

More specifically, the invention provides a redox flow battery of a liquid-circulating type which comprises:
- a positive cell;
- a negative cell;
- a permeable membrane interposed therebetween;
- two porous carbon electrodes disposed in the positive and negative cells, respectively; and
- two, positive and negative, electrolytic solutions, the electrolytic solutions being circulated in the positive and negative cells, respectively, so as to cause an oxidation-reduction reaction to take place and hence lead to charge and discharge;

(a) the battery being defined by a ratio (H/L) where (H) is the average height of each of the porous electrodes in a flow direction of each of the electrolytic solutions, and (L) is the length of each of the porous electrodes in a direction perpendicular to the flow direction of each of the electrolytic solutions, the ratio (H/L) being in the range of 0.18 to 1.95; and (b) the battery being defined by ratios ($\Sigma s_{ai}/S_a$) and ($\Sigma s_{ci}/S_c$) where ($\Sigma s_{ai}$) is the sum of the cross-sectional area of an inlet for introducing the positive electrolytic solution into the positive cell, ($\Sigma s_{ci}$) is the sum of the cross-sectional area of an inlet for introducing the negative electrolytic solution into the the negative cell, ($S_a$) is the average of the cross-sectional area of the porous electrode in a direction perpendicular to the flow direction of the positive electrolytic solution, and ($S_c$) is the average of the cross-sectional area of the porous electrode in a direction perpendicular to the flow direction of the negative electrolytic solution, each of the ratios ($\Sigma s_{ai}/S_a$) and ($\Sigma s_{ci}/S_c$) being in the range of 0.001 to 0.04, and the battery being further defined by ratios ($\Sigma s_{ao}/S_a$) and ($\Sigma s_{co}/S_c$) where ($\Sigma s_{ao}$) is the sum of the cross-sectional area of an outlet for discharging the positive electrolytic solution out of the positive cell, ($\Sigma s_{co}$) is the sum of the cross-sectional area of an outlet for discharging the negative electrolytic solution out of the negative cell, and ($S_a$) and ($S_c$) are as referred to above, each of the ratios ($\Sigma s_{ao}/S_a$) and ($\Sigma s_{co}/S_c$) being in the range of 0.001 to 0.04.

Figure 1:
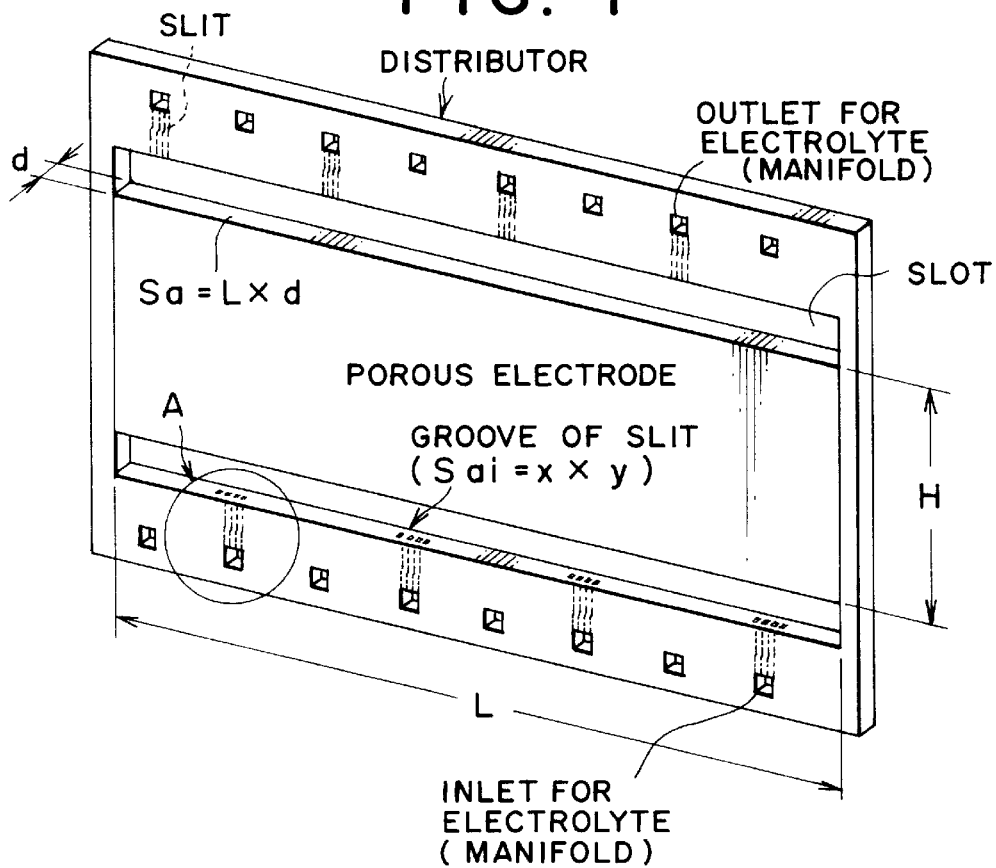
FIG. 1 is a schematic view for explanating of one preferred form of a battery separator for use in the battery according to the present invention, which battery separator is shown assembled with a porous electrode.
Figure 2:
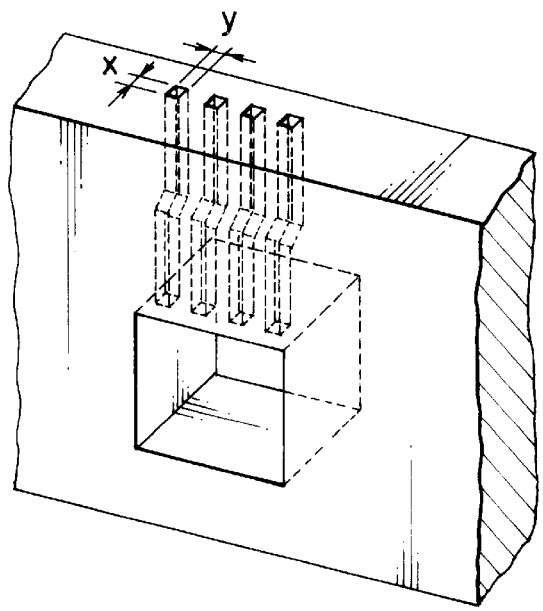
FIG. 2 is a view, partly enlarged, of a portion marked A in FIG. 1 (an inlet for introducing a positive electrolytic solution).

With regard to various legends appearing in FIGS. 1 and 2, H refers to the average height of each of two porous electrodes in a flow direction of each of two electrolytic solutions, L to the length of the porous electrode in a direction perpendicular to the flow direction of the electrolytic solution, d to the thickness of the porous electrode, $S_a$ to the average of the cross-sectional area of the porous electrode in a direction perpendicular to the flow direction of the positive electrolytic solution, ($s_{ai}$) to the cross-sectional area of an inlet (slits) for introducing a negative electrolytic solution, x to the groove depth of each such slit, and y to the groove width of each such slit.

DESCRIPTION OF THE PREFERRED EMBODIMENTS

The battery according to the present invention is defined by a ratio (H/L) where (H) is the average height of each of the porous electrodes in a flow direction of each of the positive and negative solutions, and (L) is the length of each of the electrodes in a direction perpendicular to the flow direction of each of the two solutions. The ratio (H/L) should importantly be in the range of 0.18 to 1.95. An (H/L) above 1.95 is responsible for a rise in pumping power needed to permeate the electrolytic solutions through the electrodes and hence for a decline in energy efficiency. An (H/L) below 0.18 leads to excessively increased width of the electrode in increasing its area, thus resulting in irregularly distributed flow of the electrolytic solution in the electrode, or in excessive occupation of the electrode in the resulting battery.

The (H/L) ratio ranges preferably from 0.20 to 1.50, more preferably from 0.25 to 1.00, still more preferably from 0.30 to 0.90, especially preferably from 0.35 to 0.80, and most preferably from 0.35 to 0.60.

In the practice of the battery of the invention, the average height (H) of each of the porous electrodes in a flow direction of each of the two electrolytic solutions is usually in the range of about 100 to 800 mm, preferably of 150 to 700 mm, more preferably of 200 to 600 mm, especially preferably of 300 to 500 mm, and most preferably of 350 to 450 mm.

The length (L) of each of the porous electrodes in a direction perpendicular to the flow direction of each of the positive and negative solutions is usually in the range of 300 to 1,500 mm, preferably of 500 to 1,400 mm, more preferably of 600 to 1,300 mm, especially preferably of 700 to 1,200 mm, most preferably of 800 to 1,100 mm.

Importantly, the battery of the present invention must be further defined by those ratios which are indicated below. That is:

- a ($\Sigma s_{ai}/S_a$) ratio where ($\Sigma s_{ai}$) is the sum of the cross-sectional area of an inlet for introducing the positive solution into the positive cell, and ($S_a$) is the average of the cross-sectional area of the porous electrode in a direction perpendicular to the flow direction of the positive solution;
- a ($\Sigma s_{ci}/S_c$) ratio where ($\Sigma s_{ci}$) is the sum of the cross-sectional area of an inlet for introducing the negative electrolytic solution into the the negative cell, and ($S_c$) is the average of the cross-sectional area of the porous electrode in a direction perpendicular to the flow direction of the negative solution;
- a ($\Sigma s_{ao}/S_a$) ratio where ($\Sigma s_{ao}$) is the sum of the cross-sectional area of an outlet for discharging the positive solution out of the positive cell, and ($S_a$) is as referred to above; and
- a ($\Sigma s_{co}/S_c$) ratio where ($\Sigma s_{co}$) is the sum of the cross-sectional area of an outlet for discharging the negative solution out of the negative cell, and ($S_c$) is as referred to above with each of the four ratios specified above being in the range of 0.001 to 0.04.

If either one of the ratios ($\Sigma s_{ai}/S_a$), ($\Sigma s_{ci}/S_c$), ($\Sigma s_{ao}/S_a$) and ($\Sigma s_{co}/S_c$) fails to exceed 0.001, then pressure loss becomes excessively large because of theflow at the inlet portion of the electrolyte into the positive and negative cells, or the flow of the electrolyte at the discharge the two solutions from the two cells. Another problem is that the positive and negative solutions are not sufficiently dispersible uniformly in the positive and negative cells. Conversely, if either one of the ratios ($\Sigma s_{ai}/S_a$), ($\Sigma s_{ci}/S_c$), ($\Sigma s_{ao}/S_a$) and ($\Sigma s_{co}/S_c$) ratios is above 0.04, the associated battery stack frequently gives rise to self-discharge, thus leading to reduced current efficiency, and further, the electrolytic solutions get saturated in regard to uniform dispersibility.

The ratios $(\Sigma s_{ai}/S_a)$, $(\Sigma s_{ci}/S_c)$, $(\Sigma s_{ao}/S_a)$ and $(\Sigma s_{co}/S_c)$ each are preferably in the range of 0.0012 to 0.035, more preferably of 0.0015 to 0.030, still more preferably of 0.002 to 0.025, especially preferably of 0.0025 to 0.020, and most preferably of 0.002 to 0.015.

The averages $(S_a)$ and $(S_c)$ of the cross-sectional area of the porous electrode in a direction perpendicular to the flow direction of each of the positive and negative solutions are usually from about 2 to 150 cm$^2$, preferably from 3 to 20 cm$^2$, more preferably from 5 to 100 cm$^2$, still preferably from 8 to 80 cm$^2$, especially preferably from 10 to 60 cm$^2$, most preferably from 12 to 50 cm$^2$.

By the term cross-sectional area of the porous electrode used herein is such an area as defined when the porous electrode supported by a battery separator is held in pressed sandwiched relation to two collective plate electrodes positioned on both sides of a permeable membrane.

The cross-sectional area of the porous electrode is substantially equal to that of the positive or negative cell.

In the battery of the present invention, aqueous solutions of vanadium can be suitably used as the positive and negative electrolytic solutions. To this end, it is preferred that the concentration of vanadium ions be set to be from 0.5 to 8 mols/liter, the concentration of vanadium is preferably in the range of 0.6 to 6.0 mols/liter, more preferably of 0.8 to 5.0 mols/liter, still more preferably of 1.0 to 4.5 mols/liter, especially preferably of 1.2 to 4.0 mols/liter, and most preferably of 1.5 to 3.5 mols/liter.

Concentrations of vanadium smaller than 0.5 mol/liter invite low energy density of the finished battery. Concentrations of vanadiums larger than 8.0 mols/liter make the resultant electrolytic solution highly viscous, eventually producing adversely high cell resistance and undesirably low power efficiency.

Aqueous solutions of sulfuric acid in which vanadium is contained are preferred in the practice of the present invention. The concentration of a sulfate group in each of the positive and negative solutions is preferably from 0.5 to 9.0 mols/liter, more preferably from 0.8 to 8.5 mols/liter, still more preferably of 1.0 to 8.0, especially preferably of 1.2 to 7.0 mols/liter, most preferably of 1.5 to 6.0 mols/liter.

The average bulk density of the porous electrode is usually in the range of 0.01 to 1.0 g/cc, preferably of 0.05 to 1.00 g/cc, more preferably of 0.08 to 0.80 g/cc, still more preferably of 0.10 to 0.70 g/cc, especially preferably of 0.12 to 0.50 g/cc, and most preferably of 0.15 to 0.40 g/cc.

In the practice of the present invention, a quotient (L/N) is set to be preferably in the range of 125 to 700 mm, which quotient is derived from division of the length (L) of each of the porous electrodes in a direction perpendicular to the flow direction of each of the electrolytic solutions by the number (N) of inlets for introducing the positive or negative electrolytic solutions into the positive or negative cells. Also preferably, a quotient (L/N') is in the same range as in the case of (L/N), namely of 125 to 700 mm, (L/N') being derived from division of the length (L) of each of the porous electrodes in a direction perpendicular to the flow direction of each of the positive and negative solutions by the number (N') of outlets for discharging each of the two solutions.

In the case where (L/N) or (L/N') is below 125 mm, the number of inlets and outlets should be made greater when a larger electrode area is desired. This invites a large loss of pressure during flowing of the electrolytic solutions at the inlets and outlets, requiring a rise in pumping power and hence a decline in energy efficiency. Moreover, a larger number of inlets and outlets are prone to electrolytic solutions leaking therearound. In the case where (L/N) or (L/N') is above 700 mm, the positive and negative solutions are inadequately dispersible in the electrodes.

The (L/N) and (L/N') quotients each are preferably from 150 to 600 mm, more preferably from 170 to 500 mm, still more preferably from 180 to 400 mm, especially preferably from 200 to 350 mm, and most preferably from 220 to 300 mm.

According to the battery of the present invention, each of the inlets for introducing the positive and negative solutions into the positive and negative cells, and each of the outlets for discharging the two solutions out of the two cells are constituted with a plurality of slits to which manifolds are connected to feed those solutions thereto.

The slits and manifolds are mounted on a battery separator to which a porous electrode is secured.

The width of each such slit is usually in the range of 0.5 to 3 mm, preferably of 0.6 to 2.5 mm, and more preferably of 0.8 to 2 mm. The depth of each slit is usually from 0.5 to 2.5 mm, preferably from 0.6 to 2.0 mm, and more preferably from 0.8 to 1.5 mm.

When the above slit dimensions are considered, it is preferred that the cross-sectional area $(s_{ai})$ of each inlet for the positive solution, the cross-sectional area $(s_{ao})$ of each inlet for the negative solution, the cross-sectional area $(s_{ci})$ of each outlet for the positive electrolytic solution, and the cross-sectional area $(s_{co})$ of each outlet for the negative solution each be approximately between 0.0025 and 0.06 cm$^2$, preferably between 0.005 and 0.03 cm$^2$.

The slits may be favorably adjusted in respect of cross sectioned area total number such that the positive and negative solutions can be introduced into the positive and negative cells, and the two solutions can be discharged out of the two cells at a flow rate of 0.5 to 5 m/sec, preferably of 0.8 to 4 m/sec, more preferably of 1.0 to 3 m/sec.

Each of the positive and negative cells, provided with an inlet for introducing a positive or negative solution thereinto, can be so arranged that the cell has a slot located at a bottom surface of and communicating with the corresponding porous electrode. Moreover, each of the two cells, provided with an outlet for discharging one of the two solutions therefrom, can be so arranged that the cell has another slot at a top surface of and communicating with the porous electrode. In each such slot, there may further be disposed a filler material as described later. Because of this arrangements, the electrolytic solution can be effectively dispersed in the porous electrode.

Also advantageously, when the following filler material is disposed in each of the slot mechnical vibration which would be produced during flowing of the electrolytic solution into the porous electrode ameliorated with respect to the mating ion exchange membrane to be relaxed with respect to mechanical vibration which would be produced during flowing of the electrolytic solution into the porous electrode, thus protecting the ion exchange membrane from getting mechanically deteriorating.

The filler material noted here can be of a porous structure formed of those materials which are rendered chemically resistant to the electrolytic solution, particularly to the sulfuric acid contained therein, and which are chosen preferably from polyolefins such as polyethylene, polypropylene and so on. This porous structure may have a bulk density preferably between more than 0.01 g/cc and less than 0.8 g/cc, more preferably between more than 0.05 g/cc and less than 0.5 g/cc, still more preferably between 0.08 g/cc and less than 0.4 g/cc, especially preferably between more than 0.10 g/cc and less than 0.3 g/cc. A three-dimensional fabric may be a good selection which is derivable by weaving of a fibrous polymer of a polyolefin such as polyethylene, polypropylene or the like. A yet more favorable fabric can be one obtained with use of such a fibrous polymer with a diameter preferably between above 10 μm and below 500 μm, more preferably between above 20 μm and below 300 μm, especially preferably between above 50 μm and below 200 μm.

Such porous structure may be preferably of a continuous sheet-like shape that is generally identical in size to the recess discussed above.

The battery of the present invention can take the form of, in a charged state, a mixture of tetra- and pentavalent vanadium ions, or pentavalent vanadium ions alone in a positive electrolytic solution. More advantageously, the concentration of the pentavalent vanadium ions in the positive solution in a completely charged state is in the range of 0.5 to 7.5 mols/liter, preferably of 0.6 to 5.5 mols/liter, more preferably of 0.8 to 4.5 mols/liter, still more preferably of 1.0 to 4.0 mols/liter, especially preferably of 1.2 to 3.8 mols/liter, most preferably of 1.5 to 3.5 mols/liter.

Less than 0.5 mol/liter in the concentration of pentavalent vanadium ions shows a sharp decline in energy efficiency. More than 7.5 mols/liter in such concentration has a tendency to cause precipitation of pentavalent vanadium, thus inviting impaired stability.

In a completely charged state of the battery of the present invention, the proportion of the concentration of the pentavalent vanadium ions in the positive solution relative to the concentration of all vanadium ions is preferably from 50 to 100%, more preferably from 60 to 99%, still more preferably from 65 to 98%, especially preferably from 70 to 97%, and most preferably from 75 to 96%.

Furthermore, the battery of the present invention can take the form of, in a discharged state, a mixture of tetra- and pentavalent vanadium ions, tetravalent vanadium ions alone, or a mixture of tetra- and trivalent vanadium ions in a positive solution. More advantageously, the concentration of tetravalent vanadium ions in the positive solution in a completely discharged state is in the range of 0.5 to 7.5 mols/liter, preferably of 0.6 to 5.5 mols/liter, more preferably of 0.8 to 4.5 mols/liter, still more preferably of 1.0 to 4.0 mols/liter, especially preferably of 1.2 to 3.8 mols/liter, and most preferably of 1.5 to 3.5 mols/liter.

In a completely discharged state of the battery of the invention, the proportion of the concentration of tetravalent vanadium ions in the positive solution relative to the concentration of all vanadium ions is preferably from 50 to 100%, more preferably from 60 to 99%, still more preferably from 65 to 98%, especially preferably from 70 to 97%, and most preferably from 75 to 96%.

Also in a completely discharged state, the proportion of the concentration of trivalent vanadium ions in the positive solution relative to the concentration of all vanadium ions is preferably not above 30%, more preferably less than 25%, still more preferably less than 20%, especially preferably less than 10%, and most preferably below 5%.

Porous carbon electrodes of a liquid-pervious type usable for the present invention can be preferably of a fibrous carbon molding such as of a felt-like, cord fabric-like or knit fabric-like form, or of a porous carbon molding of a sheet-like form.

Appropriate permeable membranes used herein can be chosen from among ion exchange membranes formed of organic polymeric compounds. Both cationic and anionic classes are suitably useful.

Suitable examples of the cationic ion exchange membrane are typified by those derived by sulfonating a styrene-divinyl benzene copolymer, by introducing a sulfonic acid group into a tetrafluoroethylene-perfluorosulfonyl ethoxy vinyl ether copolymer base, by copolymerizing tetrafluoroethylene with perfluorovinyl ether provided at its side chain with a carboxyl group, and by introducing a sulfonic acid group into an aromatic polysulfone copolymer base.

Suitable examples of the anionic ion exchange membrane include those obtained by introducing a chloromethyl group into a styrene-divinyl benzene copolymer base and then by aminating the resulting copolymer, by converting a vinyl pyridine-divinyl benzene copolymer into a quaternary pyridium, and by introducing a chloromethyl group into an aromatic polysulfone copolymer base and subsequently by aminating the resultant copolymer.

Figure 3:
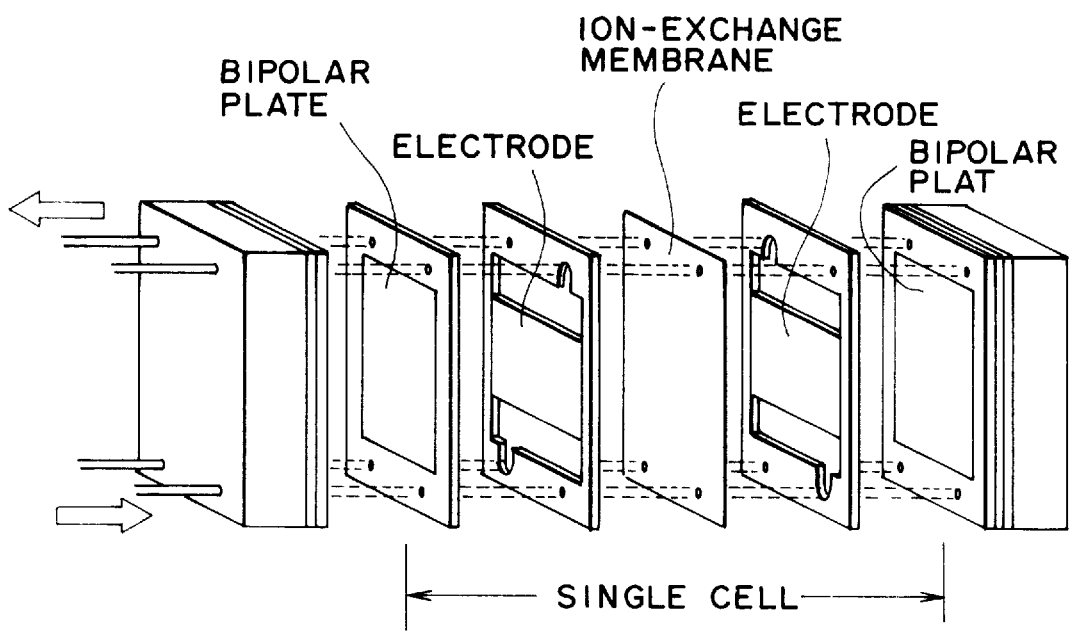
FIG. 3 is a schematic view taken to explain a unit cell used in constituting the redox flow battery of the invention.

Referring to the drawings, there is shown in FIG. 1 one preferred form of a battery separator used in the battery of the present invention, which battery separator is assembled with a porous electrode. FIG. 2 depicts, on a partly enlarged scale, an inlet (grooves or slits) shown in FIG. 1 for introducing an electrolytic solution (a positive solution). FIG. 3 illustrates a unit cell for use as a battery cell according to the invention.

The battery contemplated under the present invention is of a structure having two porous electrodes of a liquid-pervious type disposed on both sides of a permeable membrane. All these constituent parts are held in integrally pressed sandwiched relation in between two collective plate electrodes so as to provide two separate, positive and negative, cells partitioned by the permeable membrane. The thickness of each such cell may be maintained as desired by means of a suitable spacer. A positive solution composed of $V^{4+}/V^{5+}$ is allowed to circulate into the positive, while a negative solution made up of $V^{3+}/V^{2+}$ is circulated into the negative cell to thus provide a redox flow battery. In such type of battery, electrons are liberated to oxidize $V^{4+}$ into $V^{5+}$ in the positive cell during charging, and the thus liberated electrons are thereafter supplied via an external circuit in the negative cell. In the negative cell, $V^{3+}$ undergoes reduction and turns into $V^{2+}$ by the action of those electrons. Because of this oxidation-reduction reaction, hydrogen ions $H^+$ become rather excessive in the positive cell and become inversely deficient in the negative cell. At this time, the permeable membrane acts to allow excess hydrogen ions $H^+$ in the positive cell to be selectively transferred into the negative cell so that the system becomes electrically neutralized on the whole.

Energy efficiency in the above electrode reaction can be expressed by the equation given below.

power efficiency (%)=(amount of discharged power/amount of charged power)×100

In this equation, the amount of discharged power varies depending upon the internal resistance in battery cells, the ion selectivity of the permeable membrane, the loss of shunt current and the like. Low internal resistance brings about high voltage efficiency, while improved ion selectivity and lowered shunt current loss contribute to improved current efficiency.

The present invention will be further described in greater detail with reference to the following examples.

EXAMPLE 1

A battery cell shown in FIG. 3 was used with its positive and negative cells each set at a thickness of 3 mm.

A porous electrode was employed which was formed of a fibrous cellulosic carbon felt. The average height (H) of each of the porous electrodes in the flow direction of each of the positive and negative solutions was 400 mm, the length (L) of each such electrode in a direction perpendicular to the flow direction of each of the two solutions was 1,000 mm, and the ratio (H/L) was 0.40, (H) and (L) having been referred to above.

The grooved width of each of the slits was 1.1 mm, which slits were located to introduce the positive or negative solutions into the positive or negative cells respectively, and the slit depth was 1.2 mm. Four (4) slits were provided per manifold to supply either of the two solutions therein.

Namely, the inlet for introducing each of the positive or negative solutions into the positive or negative cells was composed of four slits with manifolds connected to the slits to supply one of solutions in the latter.

Te manifolds for feeding the positive or negative solutions into the slits were of a square shape with one side being 26 mm in length. The number (N) of manifolds connected to the slits for introducing one of the positive or negative solutions into the positive or negative cells respectively, and the number (N') of manifolds connected to the slits for discharging one of the positive or negative solutions from the respective positive and negative cells were four (4) in both cases, (N) being taken to mean the number of manifolds connected to the slits for introducing each of the two solutions into each of the two cells, and (N') being taken to mean the number of manifolds connected to the slits for discharging each of the two solutions from each of the two cells.

The sums ($\Sigma s_{ai}$) and ($\Sigma s_{ci}$) of the cross-sectional area of the inlets (slits) were each 21.12 mm$^2$, ($\Sigma s_{ai}$) being the sum of the cross-sectional area of the inlet for introducing the positive solution into the positive cell, and ($\Sigma s_{ci}$) being the sum of the cross-sectional area of the inlet for introducing the negative solution into the negative cell. The averages ($S_a$) and ($S_c$) of the cross-sectional areas of the porous electrodes were each 3,000 mm$^2$, ($S_a$) being the average of the cross-sectional area of the porous electrode in a direction perpendicular to the flow direction of the positive solution, and ($S_c$) being the average of the cross-sectional area of the porous electrode in a direction perpendicular to the flow direction of the negative solution. The ratios ($\Sigma s_{ai}/S_a$) and ($\Sigma s_{ci}/S_c$) were each 0.007, ($\Sigma s_{ai}$), ($S_a$), ($\Sigma s_{ci}$) and ($S_c$) having been referred to above.

The sums ($\Sigma s_{ao}$) and ($\Sigma s_{co}$) of the cross-sectional areas of the outlets (slits) were each 21.12 mm$^2$, ($\Sigma s_{ao}$) being the sum of the cross-sectional area of the inlet for discharging the positive solution out of the positive cell, ($\Sigma s_{co}$) being the sum of the cross-sectional area of the inlet for discharging the negative solution out of the negative cell. The averages ($S_a$) and ($S_c$) of the cross-sectional areas of the porous electrodes were each 3,000 mm$^2$, ($S_a$) being the average of the porous electrode in a direction perpendicular to the flow direction of the positive solution, and ($S_c$) being the average of the porous electrode in a direction perpendicular to the flow direction of the negative solution. The ratios ($\Sigma s_{ao}/S_a$) and ($\Sigma s_{co}/S_c$) were each 0.007, ($\Sigma s_{ao}$), ($S_a$), ($\Sigma s_{co}$) and ($S_c$) having been referred to above.

The quotients (L/N) and (L/N') each were 250 mm, (L/H) being derived from division of the length (L) of each of the porous electrodes in a direction perpendicular to the flow direction of each of the positive and negative solutions by the number (N) of manifolds coupled with slits for introducing the two solutions into the positive and negative cells, and (L/N') being derived from division of the length (L) of each of the porous electrodes in a direction perpendicular to the flow direction of each of the electrolytic solutions by the number (N') of manifolds coupled with slits for discharging the positive and negative solutions out of the positive and negative cells.

Twenty of these unit battery cells thus prepared were arranged in series with bipolar collective electrodes interposed therebetween.

Put to use were positive and negative solutions each in the form of an aqueous solution of sulfuric acid with a vanadium ion concentration of 2 mols/liter and a sulfate group concentration of 4 mols/liter.

Each of the positive and negative solutions was introduced at a flow rate of 6.4 cc/sec per manifold and discharged at a flow rate of 6.4 cc/sec per manifold.

The flow rate was 121.2 cm/sec at the inlet (slits) for introducing one of the two solutions into the respective one of the two cells. The flow rate was 121.2 cm/sec at the outlet (slits) for discharging each of the two solutions from each of the two cells.

Charging was conducted up to a battery cell voltage of 1.65 V, and discharging was done to a battery cell voltage of 1.16 V. In this way, charge and discharge tests were repeated. The test results are tabulated below.

COMPARATIVE EXAMPLE 1

The groove width of a slit was set to be 0.5 mm, which slit was disposed to introduce one of the positive or negative solutions into one of the positive and negative cells. The depth of such slit was 0.4 mm. Three (3) slits were disposed per manifold for supplying one of the two solutions therein.

The flow rate was 0.5 mm at a slit for discharging the two solutions from the respective are of the two cells. The depth of such slit was 0.4 mm. Three (3) slits were provided per manifold for supplying one of the two solutions therein.

Namely, the inlet for introducing the positive or negative solution into the respective one of the two cells was constructed with three slits and one manifold coupled therewith for supplying one of the two solutions therein, and the outlet for discharging one of the positive or negative solutions from one of the two cells was made up of three slits and one manifold coupled therewith for supplying one of the two solutions therein.

The sums ($\Sigma s_{ai}$) and ($\Sigma s_{ci}$) were each 2.4 mm$^2$, ($\Sigma s_{ai}$) being the sum of the cross-sectional area related to the inlet (slits) for introducing the positive solution into the positive cell, and ($\Sigma s_{ci}$) being the sum of the cross-sectional area related to the inlet (slits) for introducing the negative solution into the negative cell. The averages ($S_a$) and ($S_c$) were each 3,000 mm$^2$, ($S_a$) being the average of the cross-sectional area of a porous electrode in a direction perpendicular to the flow direction of the positive solution, and ($S_c$) being the average of the cross-sectional area of a porous electrode in a direction perpendicular to the flow direction of the negative solution. The ratios ($\Sigma s_{ai}/S_a$) and ($\Sigma s_{ci}/S_c$) were each 0.0008, ($\Sigma s_{ai}/S_a$) being the ratio of the sum of the cross-sectional area of the inlet (slits) relative to the average of the cross-sectional area of the porous electrode in a direction perpendicular to the flow direction of the positive solution, and ($\Sigma s_{ci}/S_c$) being the ratio of the sum of the cross-sectional area of the inlet (slits) relative to the average of the cross-sectional area of the porous electrode in a direction perpendicular to the flow direction of the negative solution.

The sums ($\Sigma s_{ao}$) and ($\Sigma s_{co}$) were each 2.4 mm$^2$, ($\Sigma s_{ao}$) being the sum of the cross-sectional area related to the outlet (slits) for discharging the positive solution out of the positive cell, and ($\Sigma s_{co}$) being the sum of the cross-sectional area related to the outlet (slits) for discharging the negative solution out of the negative cell. The averages ($S_a$) and ($S_c$) were each 3,000 mm², ($S_a$) being the average of the cross-sectional area of a porous electrode in a direction perpendicular to the flow direction of the positive solution, and ($S_c$) being the average of the cross-sectional area of a porous electrode in a direction perpendicular to the flow direction of the negative solution. The ratios ($\Sigma s_{ao}/S_a$) and ($\Sigma s_{co}/S_c$) were each 0.0008, ($\Sigma s_{ao}/S_a$) being the ratio of the sum of the cross-sectional area of the outlet (slits) relative to the average of the cross-sectional area of the porous electrode in a direction perpendicular to the flow direction of the positive solution, and ($\Sigma s_{co}/S_c$) being the ratio of the sum of the cross-sectional area of the outlet (slits) relative to the average of the cross-sectional area of the porous electrode in a direction perpendicular to the flow direction of the negative solution.

Each of the positive and negative solutions was introduced at a flow rate of 6.4 cc/sec per manifold and discharged at a flow rate of 6.4 cc/sec per manifold.

With the exception for the above parameters, the procedure of Example 1 was followed in effecting charge and discharge tests.

The test results are tabulated below.

COMPARATIVE EXAMPLE 2

The groove width of a slit was set to be 2.7 mm, which slit was disposed to introduce one of the positive or negative solutions into one of the positive or negative cells. The depth of such slit was 1.9 mm. Six (6) slits were formed per manifold provided to supply one of the two solutions therein.

The flow rate was 2.7 mm at a slit for discharging one of the two solutions from the respective one of the two cells. The depth of such slit was 1.9 mm. Six (6) slits were formed per manifold disposed to supply one of the two solutions therein.

Namely, the inlet for introducing the positive or negative solution into the respective one of the two cells was constructed with 6 slits and one manifold coupled therewith for supplying one of the two solutions therein, and the outlet for discharging one of the positive or negative solution from one of the two cells was made up of three slits and one manifold coupled therewith for supplying one of the two solutions therein.

The sums ($\Sigma s_{ai}$) and ($\Sigma s_{ci}$) were each 123.1 mm², the averages ($S_a$) and ($S_c$) were each 3,000 mm², and (hav $S_a$) being the average of the cross-sectional area of a porous electrode in a direction perpendicular to the flow direction of the positive solution, and ($S_c$) being the average of the cross-sectional area of a porous electrode in a direction perpendicular to the flow direction of the negative solution. The ratios ($\Sigma s_{ai}/S_a$) and ($\Sigma s_{ci}/S_c$) were each 0.041, ($\Sigma s_{ai}$), ($S_a$), and ($\Sigma s_{ci}$) and ($S_c$) each ing been referred to above.

The sums ($\Sigma s_{ao}$) and ($\Sigma s_{co}$) were each 123.1 mm$_2$, the averages ($S_a$) and ($S_c$) were each 3,000 mm², and the ratio ($\Sigma s_{ao}/S_a$) and ($\Sigma s_{co}/S_c$) were each 0.041 with ($\Sigma s_{ao}$), ($S_a$), ($\Sigma s_{co}$) and ($S_c$) each having been referred to above.

Each of the positive and negative solutions was introduced at a flow rate of 6.4 cc/sec per manifold and discharged at a flow rate of 6.4 cc/sec per manifold.

Except for the foregoing parameters, the procedure of Example 1 was followed in effecting charge and discharge tests.

The test results are tabulated below.

As is clear from the tabulated results, the redox flow battery of Example 1 has been found to exhibit lowered cell resistance and enhanced power efficiency as compared to those of Comparative Examples 1 and 2.

TABLE

| | current density mA/cm² | current efficiency % | voltage efficiency % | power efficiency % | cell resistance $\Omega$/cm² |
|---|---|---|---|---|---|
| Example 1 | 60 | 94.9 | 87.9 | 83.4 | 1.3 |
| | 80 | 96.8 | 83.8 | 81.1 | 1.3 |
| | 100 | 97.8 | 79.0 | 77.3 | 1.3 |
| Comparative Example 1 | 60 | 94.0 | 81.4 | 76.5 | 1.7 |
| | 80 | 96.0 | 74.5 | 71.5 | 1.7 |
| | 100 | 96.8 | 70.2 | 68.0 | 1.7 |
| Comparative Example 2 | 60 | 90.2 | 87.3 | 78.7 | 1.3 |
| | 80 | 92.2 | 83.0 | 76.5 | 1.3 |
| | 100 | 93.0 | 77.5 | 72.1 | 1.3 |

What is claimed is:

1. A liquid-circulating type redox flow battery which comprises:

a positive cell;

a negative cell;

a permeable membrane interposed therebetween;

two porous carbon electrodes disposed in said positive and negative cells, respectively; and two, positive and negative, electrolytic solutions, said electrolytic solutions being circulated in said positive and negative cells, respectively, so as to cause an oxidation-reduction reaction to take place and hence lead to charge and discharge;

(a) said battery being defined by a ratio (H/L) where (H) is the average height of each of said porous electrodes in a flow direction of each of said electrolytic solutions, and (L) is the length of each of said porous electrodes in a direction perpendicular to the flow direction of each of said electrolytic solutions, the ratio (H/L) being in the range of 0.18 to 1.95; and (b) said battery being defined by ratios ($\Sigma s_{ai}/S_a$) and ($\Sigma s_{ci}/S_c$) where ($\Sigma s_{ai}$) is the sum of the cross-sectional area of an inlet for introducing said positive electrolytic solution into said positive cell, ($\Sigma s_{ci}$) is the sum of the cross-sectional area of an inlet for introducing said negative electrolytic solution into said negative cell, ($S_a$) is the average of the cross-sectional area of said porous electrode in a direction perpendicular to the flow direction of said positive electrolytic solution, and ($S_c$) is the average of the cross-sectional area of said porous electrode in a direction perpendicular to the flow direction of said negative electrolytic solution, each of the ratios ($\Sigma s_{ai}/S_a$) and ($\Sigma s_{ci}/S_c$) being in the range of 0.001 to 0.04, and said battery being further defined by ratios ($\Sigma s_{ao}/S_a$) and ($\Sigma s_{co}/S_c$) where ($\Sigma s_{ao}$) is the sum of the cross-sectional area of an outlet for discharging said positive electrolytic solution out of said positive cell, ($\Sigma s_{co}$) is the sum of the cross-sectional area of an outlet for discharging said negative electrolytic solution out of said negative cell, and ($S_a$) and ($S_c$) are as denoted above, each of the ratios ($\Sigma s_{ao}/S_a$) and ($\Sigma s_{co}/S_c$) being in the range of 0.001 to 0.04.

2. The redox flow battery according to claim 1, wherein each of said positive and negative electrolytic solutions is composed of an aqueous solution having a vanadium ion concentration of 0.5 to 8 mols/liter.

3. The redox flow battery according to claim 1 or 2, wherein each of said positive and negative electrolytic solutions is composed of an aqueous solution of sulfuric acid containing vanadium and having a sulfate group concentration of 0.5 to 9.0 mols/liter.

4. The redox flow battery according to claim 1, wherein said battery is defined by averages ($S_a$) and ($S_c$) each in the range of 5 to 50 cm$^2$, ($S_a$) being the average of the cross-sectional area of said porous electrode in a direction perpendicular to the flow direction of said positive electrolytic solution, and ($S_c$) being the average of the cross-sectional area of said porous electrode in a direction perpendicular to the flow direction of said negative electrolytic solution.

5. The redox flow battery according to claim 1, wherein said porous electrode has an average bulk density of 0.01 to 1.0.

6. The redox flow battery according to claim 1, wherein said battery is defined by quotients (L/N) and (L/N') each in the range of 125 to 1,000 mm, (L/N) being derived from division of the length (L) of each of said porous electrodes in a direction perpendicular to the flow direction of each of said positive and negative electrolytic solutions by the number (N) of manifolds coupled with slits for introducing one of the two solutions into the respective one of said positive or negative cells, and (L/N') being derived from division of the length (L) of each of said porous electrodes in a direction perpendicular to the flow direction of each of the two solutions by the number (N') of manifolds coupled with slits for discharging each of the two solutions.

7. The redox flow battery according to claim 1, wherein each of the inlet and outlet is comprised of a plurality of slits, said inlet being disposed to introduce one of said positive or negative electrolytic solution into the respective one of said positive or negative cells and coupled with a manifold for supplying each of the two solutions in said slits, and said outlet being disposed to discharge one of said positive or negative electrolytic solution into the respective one of said positive or negative cells and coupled with a manifold for supplying each of the two solutions in said slits.

8. The redox flow battery according to claim 1, wherein each of the average flow rates at said inlet and said outlet is in the range of 0.2 to 500 cm/sec, said inlet being for introducing one of said positive or negative electrolytic solution into the respective one of said positive or negative cells, and said outlet being for discharging one of said positive or negative electrolytic solutions from the respective one of said positive or negative cells.

9. The redox flow battery according to claim 1, wherein, in a complelely charged state, said positive electrolytic solution has a pentavalent vanadium ion concentration of 0.5 to 7.5 mols/liter, said pentavalent vanadium ion concentration having a ratio of 50 to 100% with respect to the concentration of all vanadium ions.

10. The redox flow battery according to claim 1, wherein, in a completely discharged state, said positive electrolytic solution has a tetravalent vanadium ion concentration of 0.5 to 7.5 mols/liter, said tetravalent vanadium ion concentration having a proportion of 50 to 100% with respect, to the concentration of all vanadium ions.

* * * * *